US011130563B2

(12) United States Patent
Heer et al.

(10) Patent No.: US 11,130,563 B2
(45) Date of Patent: Sep. 28, 2021

(54) MONOLITHIC OUTBOARD GEAR BEAM SUPPORT FITTING

(71) Applicant: The Boeing Company, Chicago, IL (US)

(72) Inventors: Steven Scott Heer, Lake Stevens, WA (US); Eric Sean Kamila, Seattle, WA (US); Benjamin Joseph Palmer, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 450 days.

(21) Appl. No.: 16/183,489

(22) Filed: Nov. 7, 2018

(65) Prior Publication Data

US 2020/0140066 A1 May 7, 2020

(51) Int. Cl.
*B64C 25/10* (2006.01)
*F15B 15/20* (2006.01)
*F16C 11/06* (2006.01)

(52) U.S. Cl.
CPC .............. *B64C 25/10* (2013.01); *F15B 15/20* (2013.01); *F16C 11/06* (2013.01)

(58) Field of Classification Search
CPC ......... B64C 25/10; B64C 25/28; B64C 25/00; B64C 25/04; F15B 15/20; F16C 11/06
USPC ................................ 403/2, 79; 248/548, 909
See application file for complete search history.

(56) References Cited

U.S. PATENT DOCUMENTS

| | | | |
|---|---|---|---|
| 4,087,062 A | 5/1978 | Masclet | |
| 4,537,374 A * | 8/1985 | Barnoin | F16F 7/125 188/371 |
| 5,846,014 A * | 12/1998 | Arthur | F16C 27/063 403/2 |
| 6,007,267 A * | 12/1999 | VanHorn | B66C 15/00 403/2 |
| 2006/0006282 A1* | 1/2006 | Mellor | B64C 25/10 244/102 A |
| 2009/0265120 A1 | 10/2009 | O'Brien | |

(Continued)

FOREIGN PATENT DOCUMENTS

| | | |
|---|---|---|
| EP | 0319051 A2 | 6/1989 |
| KR | 101850217 B1 | 4/2018 |
| WO | WO8202180 A1 | 7/1982 |

OTHER PUBLICATIONS

European Patent Office; Extended European Search Report for Application No. 19207555.4 dated Mar. 30, 2020.

*Primary Examiner* — Muhammad Ijaz
(74) *Attorney, Agent, or Firm* — Parsons Behle & Latimer

(57) ABSTRACT

A breakaway support configured to selectively release an actuator from a fitting and a method of providing the breakaway support. The breakaway support includes a race positioned between the actuator and the fitting. The second end of the actuator is connected to the fitting via a ball joint is positioned within the race. The ball joint permits the actuator to pivot about the ball joint in a vertical plane between a first position and a second position. The breakaway support includes a first knuckle that causes the actuator to release from the fitting when the actuator moves in a first direction beyond the first position. A portion of the fitting or a second knuckle may cause the actuator to release from the fitting when the actuator moves in a second direction beyond the second position. A portion of the actuator may break to release the actuator from the fitting.

33 Claims, 7 Drawing Sheets

(56) References Cited

U.S. PATENT DOCUMENTS

| | | | | |
|---|---|---|---|---|
| 2013/0048783 A1* | 2/2013 | Ekmedzic | ............... | B64C 25/04 244/102 R |
| 2014/0151500 A1* | 6/2014 | Bellet | ..................... | B64C 25/04 244/102 A |
| 2014/0197276 A1* | 7/2014 | Otto | ........................ | B64C 25/18 244/102 A |
| 2020/0140066 A1* | 5/2020 | Heer | ....................... | B64C 25/00 |

* cited by examiner

MONOLITHIC OUTBOARD GEAR BEAM SUPPORT FITTING

FIELD OF THE DISCLOSURE

The examples described herein relate to a monolithic outboard landing gear beam support fitting, and methods of providing a monolithic outboard landing gear beam support fitting.

BACKGROUND

Description of the Related Art

Aircraft include landing gear that may be extended for landing and takeoff and retracted into the aircraft during flight. An actuator is connected to the main landing gear trunnion of the aircraft and is used to extend and retract the landing gear. The actuator is connected to the wing rear spar via a first fitting, which may be referred to as a bridge fitting. A second fitting, which may be referred to as a mini cant fitting, connects a gear beam to the wing rear spar. The process of assembly the two separate fittings, the mini cant fitting and the bridge fitting, can be complicated as wing skin contour must be machined with the two fittings assembled together. Variances in the tolerances of the two fittings may combine to increase the difficulty of the assembly with the rear wing spar and wing skin contour.

A current design to connect the actuator to the wing rear spar uses a horizontally oriented fuse pin. The fuse pin is designed to shear and release the actuator from the wing rear spar upon the application of a high load due to an impact event. However, it may be beneficial to reduce the load required to release the actuator from the wing rear spar. As discussed above, the landing gear is typically connected to the wing rear spar of an aircraft by the fittings. Aircrafts may include a fuel tank located within the wing rear spar. Upon an impact load to the landing gear, the actuator and/or main landing gear trunnion may penetrate the fuel tank located within the rear wing spar, which is undesirable. It is desirable to have the fuel tank remain intact upon the application of an impact load being applied to the landing gear system. Other disadvantages of current flap deployment systems may exist.

SUMMARY

The present disclosure is directed to a breakaway support that is configured to release a landing gear actuator from a fitting when the actuator pivots past a first position or pivots past a second position. The actuator may pivot past either the first position or the second position due to an impact event. The selectively release of the landing gear actuator may decrease the probability of puncturing a fuel tank within the wing box of an aircraft.

One example of the present disclosure is a breakaway support comprising an actuator having a first end and a second end and a fitting. The breakaway support comprises a race positioned between the actuator and the fitting. The breakaway support includes a ball joint located within the race, the second end of the actuator being connected to the fitting via the ball joint. The ball joint is configured to permit the actuator to pivot about the ball joint in a vertical plane between a first position and a second position. The breakaway support includes a first knuckle. The first knuckle causes the actuator to release from the fitting when the actuator moves in a first direction beyond the first position.

The breakaway support may include a second knuckle that causes the actuator to release from the fitting when the actuator moves in a second direction beyond the second position. A portion of the actuator may be configured to break to release the actuator from the fitting when the actuator moves in the first direction beyond the first position or when the actuator moves in the second direction beyond the second position. The portion of the actuator configured to break may have a reduced outer diameter compared to an outer diameter of adjacent portions of the actuator.

The breakaway support may include a rod that connects the second end of the actuator to the ball joint. A portion of the rod may be configured to break to release the actuator from the fitting when the actuator moves in the first direction beyond the first position or when the actuator moves in the second direction beyond the second position. The portion of the rod configured to break may have a reduced outer diameter compared to an outer diameter of adjacent portions of the rod. The rod may be a unitary component of the ball joint. The first knuckle may be located on the rod and the second knuckle may be located on the rod. The first knuckle may be located on the fitting and the second knuckle may be located on the fitting. The first knuckle may be located on the actuator and the second knuckle may be located on the actuator.

The breakaway support may include a fastener and a nut coupling the second end of the actuator to the fitting via the ball joint, the fastener being positioned through an opening in the ball joint. The fastener may be oriented in a vertical direction along a central axis of the ball joint. The fitting may comprise an opening with the ball joint being positioned within the opening. The second end of the actuator may comprise a clevis with the opening of the fitting, the race, and the ball joint being positioned within the clevis. The clevis may include a first opening and a second opening. The fastener may pass through the first opening in the clevis, the race, the opening in the ball joint, and the second opening in the clevis to couple the second end of the actuator to the fitting via the ball joint. The first end of the actuator may be connected to a main landing gear trunnion of an aircraft. The actuator may be configured to retract and extend the landing gear of the aircraft.

One example of the present disclosure is a breakaway support system. The breakaway support system comprises a fitting having a first vertical wall, a second vertical wall that extends from the first vertical wall, and a cross member connected between the first vertical wall and the second vertical wall. The second vertical wall is perpendicular to the first vertical wall. The fitting includes a first opening in the cross member. The breakaway support system includes an actuator having a first end and a second end with the actuator being configured to retract and extend a landing gear of an aircraft. The breakaway support system comprises a race positioned within the first opening in the cross member. The breakaway support system includes a ball joint located within the race. The race is positioned between the second end of the actuator and the cross member. The ball joint is configured to permit the actuator to pivot about the ball joint in a vertical plane between a first positioned and a second position. The breakaway support system includes a first knuckle that causes the actuator to release from the fitting when the actuator moves in a first direction beyond the first position.

The cross member may be horizontal with respect to the first vertical wall and the second vertical wall. The breakaway support system may include a second knuckle that causes the actuator to release from the fitting when the actuator moves in a second direction beyond the second position. The first knuckle may extend from a top surface of the cross member and the second knuckle may extend from a bottom surface of the cross member. The actuator may comprise a breakaway portion configured to break to release the actuator from the fitting when the actuator moves in the first direction beyond the first position or when the actuator moves in the second direction beyond the second position.

The cross member may cause the actuator to release from the fitting when the actuator moves in a second direction beyond the second position. The second end of the actuator may comprise a clevis with the first opening of the cross member, the race, and the ball joint being positioned within the clevis. The breakaway support system may comprise a fastener and a nut to selectively connect the second end of the actuator to the fitting. The fastener may extend through the clevis, the race, and the ball joint and the fastener may be oriented parallel with the first vertical wall and the second vertical wall. The breakaway support system may include a second opening and a third opening in the first vertical wall of the fitting and a landing gear beam connected to the fitting via the second and third openings. The breakaway support system may include a fourth opening and a fifth opening in the second vertical wall of the fitting that may be configured to connect the fitting to a wing of the aircraft.

One example of the present disclosure is a method of providing a breakaway support of an aircraft. The method comprises providing an actuator having a first end and second end and providing a fitting. The method includes providing a race and positioning a ball joint within the race. The method comprises providing a first knuckle and connecting the second end of the actuator to the ball joint, which is configured to permit the actuator to pivot about the ball joint. The first knuckle is configured to release the actuator from the fitting when the actuator moves past a first positioned in a first direction.

A portion of the fitting may be configured to release the actuator from the fitting when the actuator moves past a second position in a second direction. The method may include providing a second knuckle configured to release the actuator from the fitting when the actuator moves past a second position in a second direction. The actuator may be release from the fitting by breaking a portion of the actuator. The second end of the actuator may be connected to the ball joint via a rod. The actuator may be released from the fitting by breaking a portion of the rod. The method may include selectively connecting the second end of the actuator to the ball joint by positioning a fastener through the second end of the actuator, the race, and the ball joint.

Figure 2:
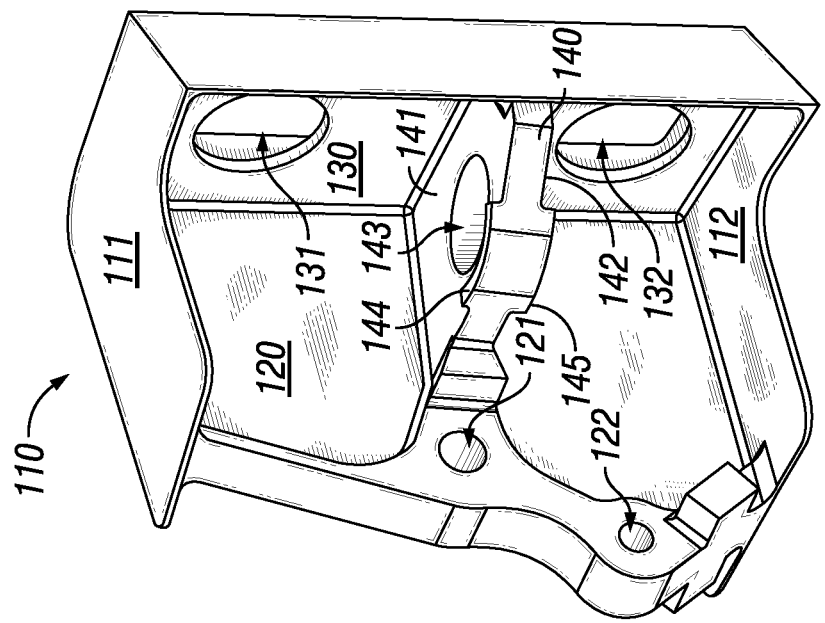
FIG. 2 is a schematic of an example of a fitting for a breakaway support.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
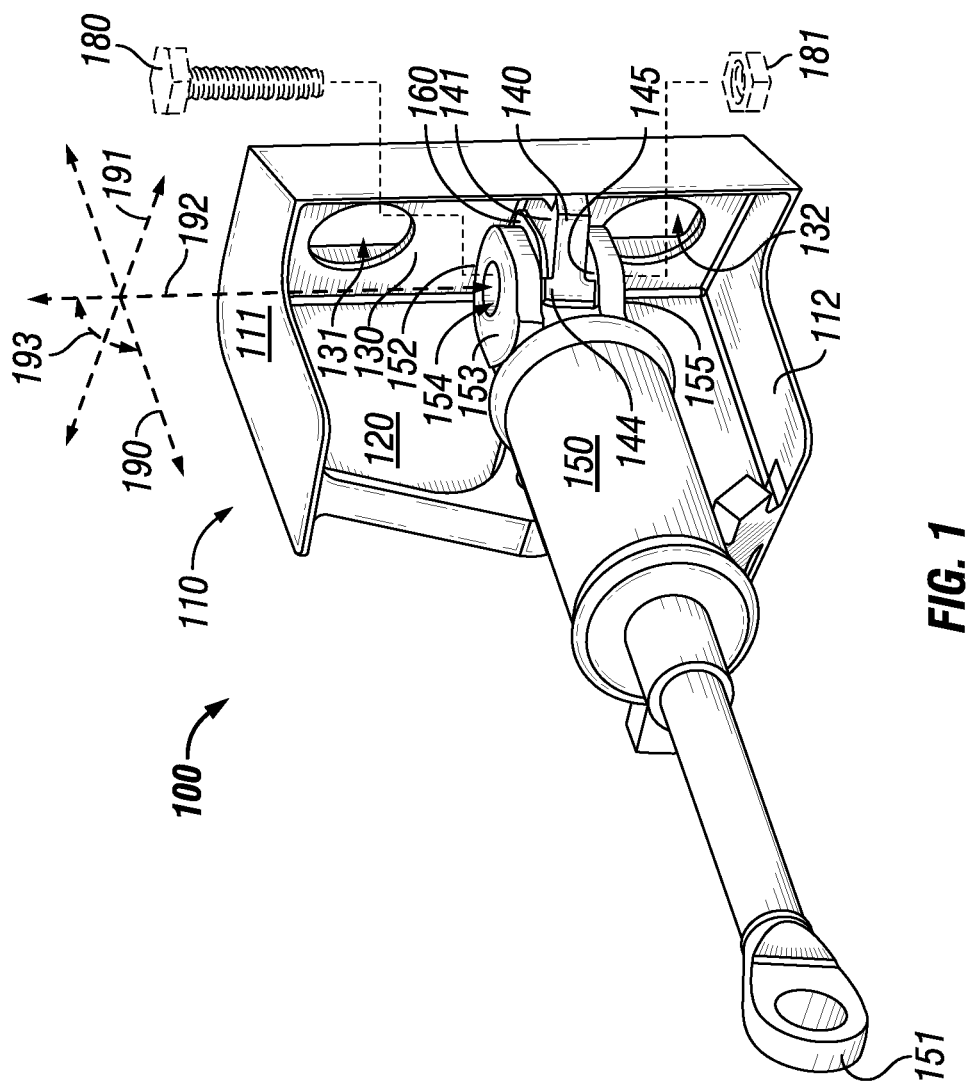
FIG. 1 is a schematic of an example of a breakaway support system.
Figure 3:
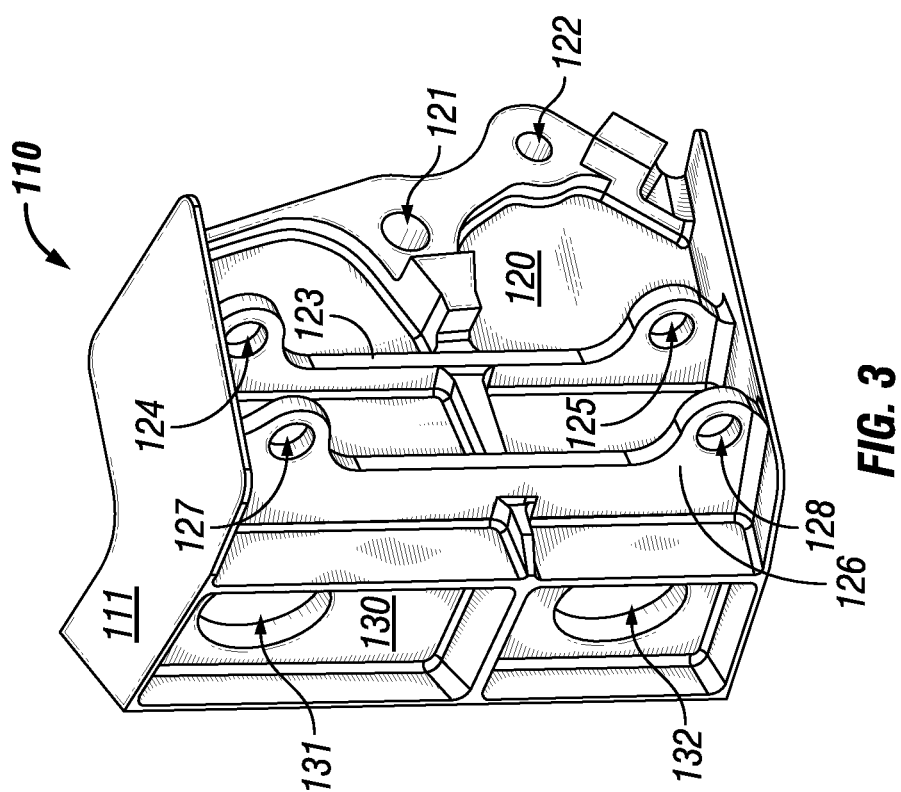
FIG. 3 is a schematic of an example of a fitting for a breakaway support.

FIG. 1 shows a schematic of one example of a breakaway support system 100. The breakaway support system 100 includes an actuator 150 connected to a fitting 110. FIG. 2 shows a schematic front perspective view of one example of a fitting 110 and FIG. 3 shows a schematic rear perspective view of one example of a fitting 110. The fitting 110 includes a first wall 120 and a second wall 130. The first wall 120 may be vertical oriented wall, herein referred to as a first vertical wall, and the second wall 130 may be vertically oriented wall, herein referred to as a second vertical wall. The second wall 130 is connected to and extends perpendicular from the first wall 120. A cross member 140 is connected to both the first wall 120 and the second wall 130. The cross member 140 may be positioned horizontal with respect to the first and second vertical walls 120, 130. The cross member 140 may be orientated substantially perpendicular to both first wall 120 and the second wall 130. The fitting 110 includes a top plate 111 and a bottom plate 112. The first wall 120, second wall 130, cross member 140, top plate 111, and bottom plate 112 may be formed together to form a unitary fitting 110.

The cross member 140 includes a first, or top, surface 141 and a second, or bottom, surface 142 best shown in FIG. 2. The cross member 140 includes a first opening 143 best shown in FIG. 2. A first, or top, knuckle 144 extends from the top surface 141 of the cross member 140. The first knuckle 144 is configured to selectively release the actuator 150 from the fitting 110 as discussed herein. A second, or bottom, knuckle 145 extends from the bottom surface 142 of the cross member 140. The second knuckle 145 is configured to selectively release the actuator 150 from the fitting 110 as discussed herein.

The first wall 120 of the fitting 110 includes a second opening 121 and a third opening 122 best shown in FIG. 2. The second and third openings 121, 122 are configured to enable the fitting 110 to be connected to a landing gear beam 410 (shown in FIG. 7). Fasteners (not shown) would be inserted through the second and third openings 121, 122 to selectively connect the fitting 110 to the landing gear beam 410 as would be appreciated by one of ordinary skill in the art having the benefit of this disclosure. The backside of the first wall 120 may include a first flange 123 having openings 124, 125 and a second flange 126 having openings 127, 128. The flanges 123, 126 and openings 124, 125, 127, 128 are configured as aircraft wing flap supports.

The second wall 130 of the fitting 110 includes a fourth opening 131 and a fifth opening 132. The fourth and fifth openings 131, 132 are configured to enable the fitting 110 to be connect to a wing of an aircraft. Specifically, fasteners (not shown) may be inserted through the fourth and fifth openings 131, 132 to selectively connect the fitting 110 to a rear wing spar 420 (shown in FIG. 7) as would be appreciated by one of ordinary skill in the art having the benefit of this disclosure. The fitting 110 is a monolithic support fitting that provides connection of the landing gear beam 410 (shown in FIG. 7) to the rear wing spar 420 (shown in FIG. 7) as well as connecting the actuator 150 to the rear wing spar 420. The assembly of the single fitting 110 within the wing skin contour is reduced as compared to the prior landing gear assembly that utilized two separate fittings as would be appreciated by one of ordinary skill in the art having the benefit of this disclosure.

Figure 4:
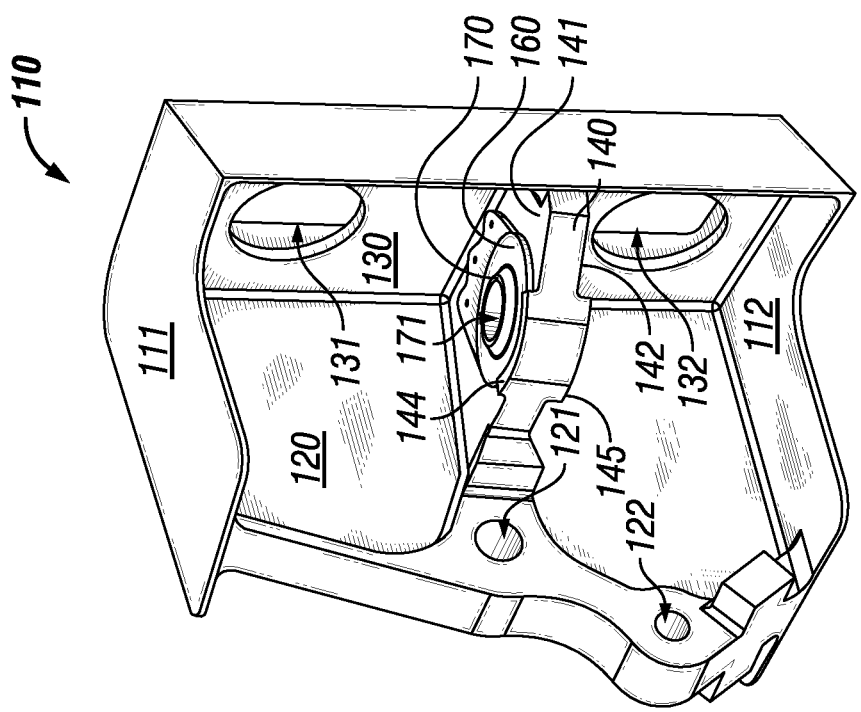
FIG. 4 is a schematic of an example of a fitting for a breakaway support.
Figure 5:
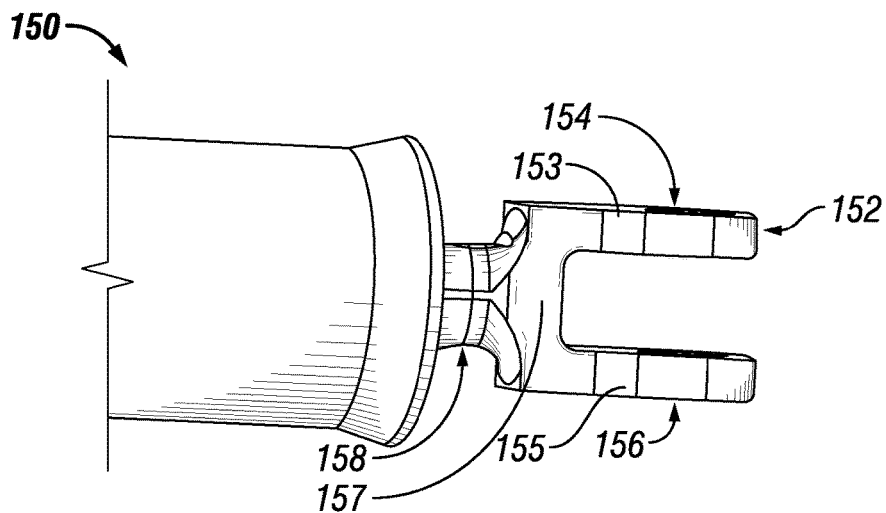
FIG. 5 is a schematic of an example of an actuator for use in a breakaway support system.

FIG. 4 is a schematic perspective view of the fitting 110 with ball joint 170 positioned within a race 160. The race 160 is configured to permit the movement of the ball joint 170 within the race 170 as discussed herein. The ball joint 170 is positioned within the first opening 143 of the cross member 140. The actuator 150 is connected to the fitting 110 via a ball joint 170. As shown in FIGS. 1 and 5, the actuator 150 includes a first end 151 and a second end 152. The second end 152 of the actuator 150 is formed into a clevis, or fork. The clevis includes an upper member 153 and a lower member 155 connected via a connecting member 157 as shown in FIG. 5. The upper member 153 includes an opening 154 and the lower member 155 includes an opening 156. The ball joint 170 includes an opening 171 as shown in FIG. 4.

A fastener 180 and corresponding nut 181 may be used to selectively connect the second end 152 of the actuator 150 to the fitting 110 via the ball joint 170. The fastener 180 is positioned through the opening 154 in the upper member 153 of the clevis, through the race 160 and opening 171 in the ball joint 170 positioned in the opening 143 of the cross member 140, and through the opening 156 in the lower member 155 of the clevis. The openings 143, 154, 156, 171 are configured so that the fastener 180 is aligned vertically with respect to the end of the actuator 150 as shown in FIG. 1. The nut 181 may be secured onto the end of the fastener 180 to secure the second end 152 of the actuator 150 to the fitting 110 as would be appreciated by one of ordinary skill in the art having the benefit of this disclosure.

The fastener 180 is vertically oriented with respect to the second end 152 of the actuator 150 in contrast to the horizontally oriented shear pin of the prior design. The fastener 180 is positioned through the ball joint 170 and race 160 permitting the actuator 150 to pivot about the ball joint 170 as discussed herein. The fastener 180 is not designed to selectively release the actuator 150 from the rear wing spar 420 (shown in FIG. 7). Rather, a knuckle, such as first knuckle 144, applies a load to the actuator 150, or another component of the system as discussed herein, causes the actuator 150 to break releasing it from the rear wing spar 420. This configuration enables a lower load to be applied to release the actuator 150 than the prior use of the horizontally oriented fuse pin. The ability to release at a lower load may result in reduced cost and/or weight of the various components.

The ball joint 170 and race 160 enable the actuator 150 to pivot about the ball joint 170 in a vertical plane as shown in FIG. 1 between a first position and a second position as discussed herein. As an example, the first position and the second position may be approximately 15 degrees apart. The actuator 150 pivots about the ball joint 170 in a first direction D1 (shown in FIG. 6) to a first position when extending the landing gear of an aircraft and pivots about the ball joint 170 in a second direction D2 (shown in FIG. 6) to a second position when retracting the landing gear of an aircraft as discussed herein. The vertical plane that the actuator 150 pivots within is formed by the centerline of the actuator 150, indicated by arrow 190, and the centerline of the opening 143 of the cross member 140, indicated by arrow 192. The actuator 150 pivots about an axis transverse to the centerline of the actuator 150 located at the centerline of the opening 143 of the cross member 140, indicated by arrow 191. The pivoting motion of the actuator 150 is indicated by arrow 193.

FIG. 5 shows a schematic of a portion of an example of an actuator 150. The second end 152 of the actuator 150 is formed into a clevis, or fork. The clevis includes an upper member 153 and a lower member 155 connected via a connecting member 157. The upper member 153 includes an opening 154 and the lower member 155 includes an opening 156. As discussed herein, the openings 154, 156 enable the second end 152 of the actuator 150 to be selectively connected to a fitting 110 via a ball joint 170 connected to the fitting 110. A fastener 180 may be positioned through the opening 154 in the upper member 153 of the clevis, through the race 160 and opening 171 in the ball joint 170 positioned in the opening 143 of the cross member 140, and through the opening 156 in the lower member 155 of the clevis. The openings 143, 154, 156, 171 are configured so that the fastener 180 is aligned vertically with respect to the end of the actuator 150. A portion 158 of the actuator 150 may be configured to break to selectively release the actuator 150 from the fitting 110 as discussed herein. For example, the portion 158 of the actuator 150 may be necked down. In other words, the portion 158 of the actuator 150 configured to selectively break may have a reduced outer diameter than adjacent portions of the actuator 150 as shown in FIG. 5.

Figure 6:
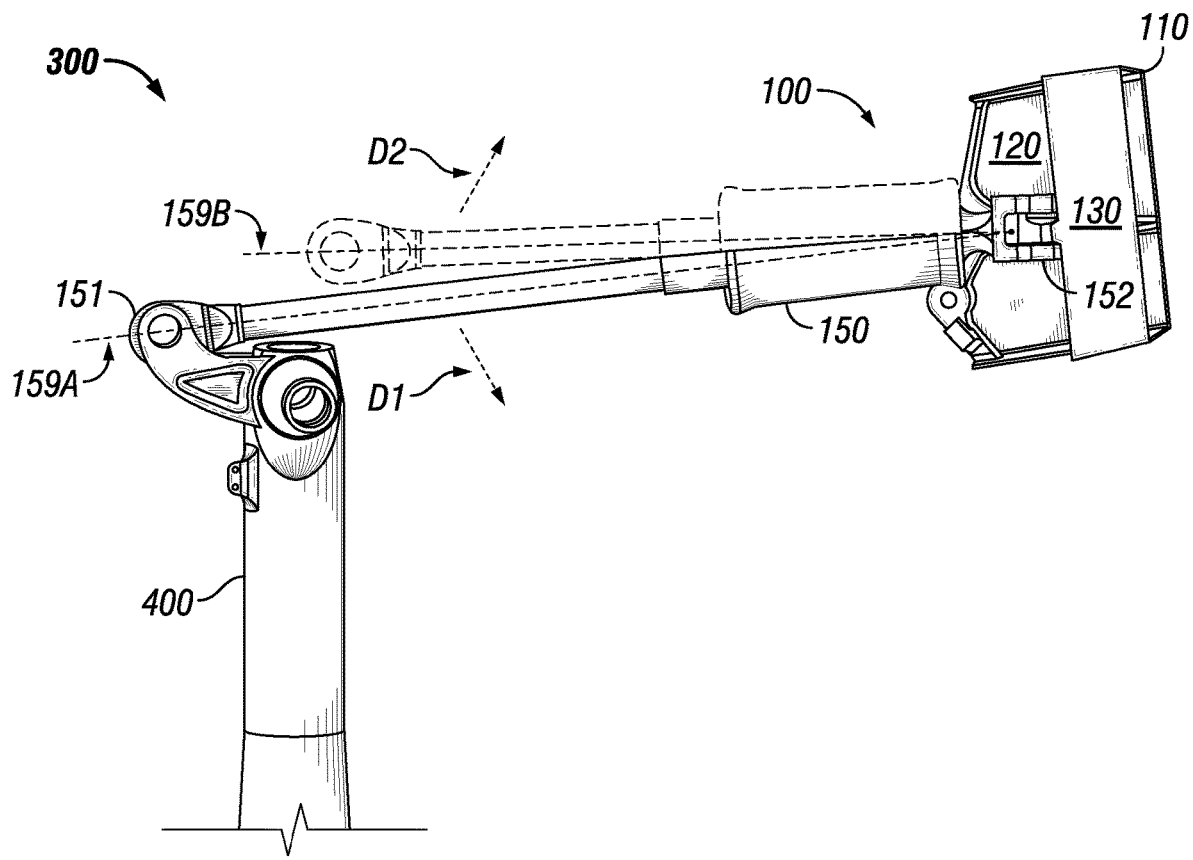
FIG. 6 is a schematic of an example of a breakaway support system.

FIG. 6 is a schematic of an example of a breakaway support system 300. The breakaway support system 300 includes a breakaway support system 100 connected to a main landing gear trunnion 400 of an aircraft. The breakaway support system 100 includes an actuator 150 connected to a fitting 110 having a first wall 120 and a second wall 130. The fitting 110 is configured be to connect to a landing gear beam 410 (shown in FIG. 7) and rear wing spar 420 (shown in FIG. 7) as discussed herein. A first end 151 of the actuator 150 is connected to the main landing gear trunnion 400 of the aircraft and the second end 152 of the actuator 150 is connected to the fitting 110 via a ball joint 170 (best shown in FIG. 4) as discussed herein.

The actuator 150 is configured to retract and extend landing gear 405 (shown in FIG. 7) connected to the end of the main landing gear trunnion 400. FIG. 6 shows the actuator 150 is a first, or extended, position as indicated by centerline 159A of the actuator 150. As the actuator 150 retracts the landing gear 405, the actuator 150 pivots in a second direction, D2, about the ball joint 170 until it reaches a second position shown in dash and indicated by centerline 159B of the actuator. When the actuator 150 extends the landing gear 405 from the retracted position, the actuator 150 pivots in a first direction D1 about the ball joint 170 until it reaches the first position indicated by centerline 159A of the actuator 150. The second end 152 of the actuator 150, the fitting 110, and the race 160 and ball joint 170 are each configured to permit the pivoting motion of the actuator 150 between the first and second positions for normal operation of the landing gear 405.

Figure 7:
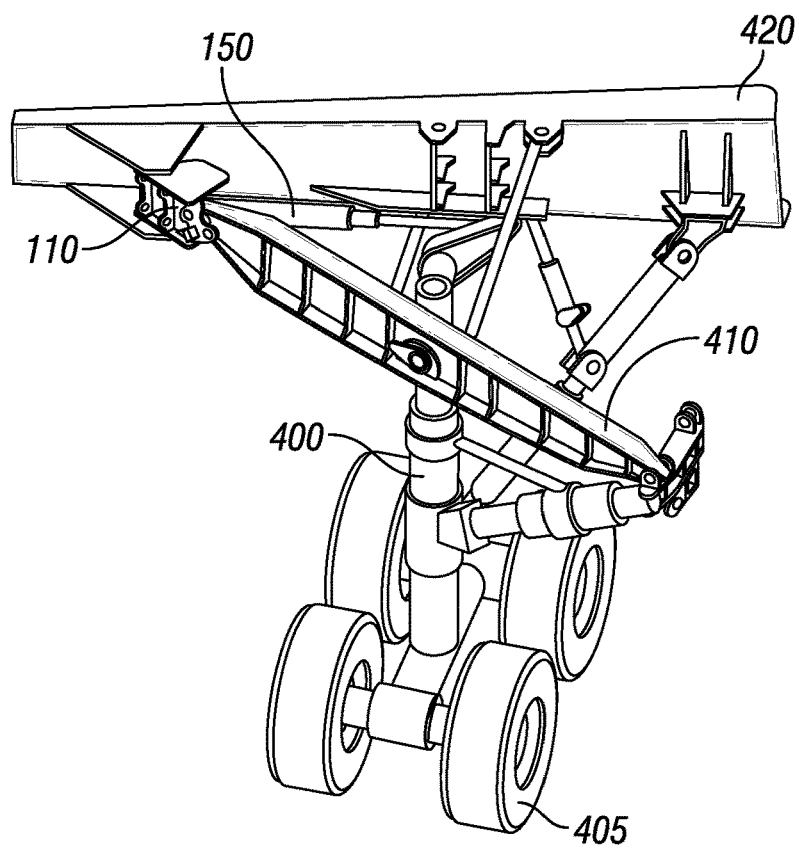
FIG. 7 is a schematic of an example of a breakaway support system connected to a rear spar of an aircraft.

FIG. 7 is a schematic of an example of a breakaway support system 300 connected to a wing rear spar 420 of an aircraft. A fitting 110 (best shown in FIGS. 1-4) is connected to the wing rear spar 420 of the aircraft. As discussed herein, fasteners inserted through fourth and fifth openings 131, 132 in a second wall 130 of the fitting connect the fitting 110 to the wing rear spar 420 of an aircraft. An actuator 150 configured to retract and extend landing gear 405 is connected to one end of a main landing gear trunnion 400 with the landing gear 405 being connected to the other end of the main landing gear trunnion 400. As discussed herein, a second end 152 of the actuator 150 is connected to the fitting 110 via a race 160 and ball joint 170. An end of a landing gear beam 410 is also connected to a portion of the fitting 110 of the breakaway support system 300. As discussed herein, fasteners through second and third openings 121, 122 in a first wall 120 of fitting 110 connect the fitting to the landing gear beam 410.

The actuator 150 and the fitting 110 are configured to selectively release the actuator 150 from the fitting 110 when the actuator 150 pivots in the first direction D1 beyond the first position, which is indicated by the centerline 159A of the actuator 150. Likewise, the actuator 150 and the fitting 110 are configured to release the actuator 150 from the fitting 110 when the actuator 150 pivots in the second direction D2 beyond the second position, which is indicated by the centerline 159B of the actuator 150. The actuator 150 may be released from the fitting 110 to potentially prevent the penetration of a wing fuel box due to the movement of the actuator 150 outside of the first and second positions. For example, an impact event may cause the actuator 150, which is connected to the main landing gear trunnion 400, to pivot in the second direction D2 past the second, or retracted, position.

The movement of the actuator 150 in the second direction D2 past the second, or retracted, position causes a portion of the actuator 150 to engage the second knuckle 145 that extends from the bottom surface 142 of the cross member 140 of the fitting 110. The engagement of a portion of the actuator 150 against the second knuckle 145 exerts a force onto the actuator 150, which causes the actuator 150 to be release from the fitting 110. Various mechanisms may be used to selectively release the actuator 150 as would be appreciated by one of ordinary skill in the art having the benefit of this disclosure. For example, the actuator 150 may include a portion 158 configured to selectively break and the load on the actuator 150 by the second knuckle 145 may cause a portion 158 to break releasing the actuator 150 from the fitting 110.

The movement of the actuator 150 in the first direction D1 past the first, or extended, position causes a portion of the actuator 150 to engage the first knuckle 144 that extends from the top surface 141 of the cross member 140 of the fitting 110. The engagement of a portion of the actuator 150 against the first knuckle 144 exerts a force onto the actuator 150, which causes the actuator 150 to be release from the fitting 110. Various mechanisms may be used to selectively release the actuator 150 as would be appreciated by one of ordinary skill in the art having the benefit of this disclosure. For example, the actuator 150 may include a portion 158 configured to selectively break and the load on the actuator 150 by the first knuckle 144 may cause a portion 158 to break releasing the actuator 150 from the fitting 110.

Figure 8:
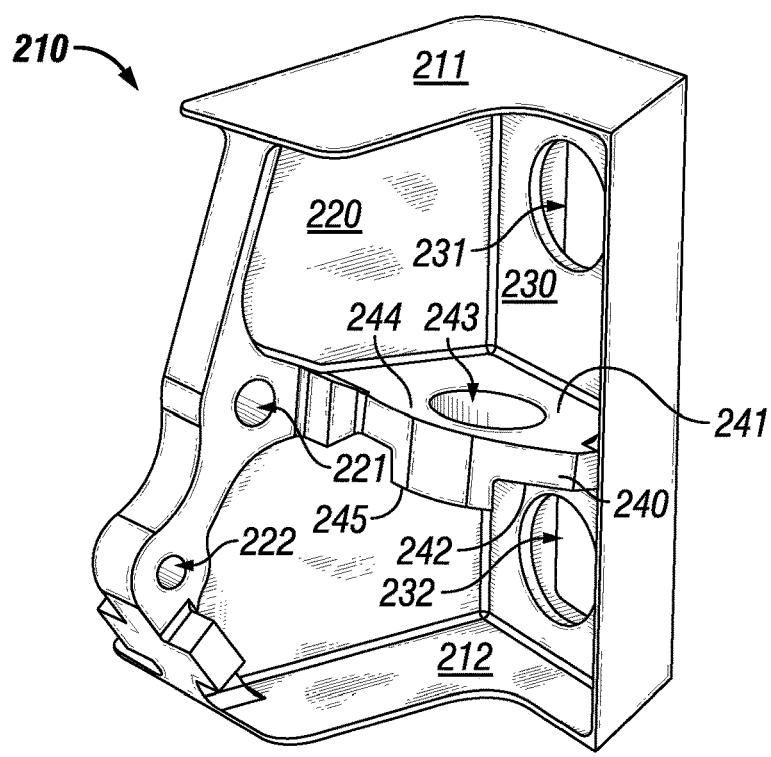
FIG. 8 is a schematic of an example of a fitting for a breakaway support.

FIG. 8 is a schematic of an example of a fitting 210 for a breakaway support system. The fitting 210 includes a first wall 220 and a second wall 230. The first wall 220 may be a first vertical wall and the second wall 230 may be a second vertical wall. The second wall 230 is connected to and extends perpendicular from the first wall 220. A cross member 240 is connected to both the first wall 220 and the second wall 230. The fitting 210 includes a top plate 211 and a bottom plate 212. The first wall 220, second wall 230, cross member 240, top plate 211, and bottom plate 212 may be formed together to form a unitary fitting 210.

The cross member 240 includes a first, or top, surface 241 and a second, or bottom, surface 242. The cross member 240 includes a first opening 243 that is configured to a race 160 and ball joint 170 as discussed herein. The cross member 240 of the fitting 210 is configured to release an actuator 150 when the actuator 150 pivots in a first direction D1 past a first position or pivots in a second direction D2 past a second position as discussed herein. A first knuckle 245 extends from the bottom surface 242 of the cross member 240. The first knuckle 245 is configured to selectively release the actuator 150 from the fitting 210 as discussed herein. The first knuckle 245 is configured to release the actuator 150 from the fitting 210 when the actuator pivots in a first direction D1 past a second position. A portion of the cross member 240 is configured to selectively release the actuator 150 from the fitting 210. The cross member 240 may be canted, or oriented at an angle, so that an edge 244 of the top surface 241 of cross member 240 is configured to release an actuator 150 in a second direction D2 past a second position.

The first wall 220 of the fitting 210 includes a second opening 221 and a third opening 222. The second and third openings 221, 222 are configured to enable the fitting 210 to be connected to a landing gear beam 410 (shown in FIG. 7). Fasteners (not shown) would be inserted through the second and third openings 221, 222 to selectively connect the fitting 210 to the landing gear beam 410 as would be appreciated by one of ordinary skill in the art having the benefit of this disclosure.

The second wall 230 of the fitting 210 includes a fourth opening 231 and a fifth opening 232 configured to enable the fitting 210 to be connect to a wing of an aircraft. Specifically, fasteners (not shown) may be inserted through the fourth and fifth openings 231, 232 to selectively connect the fitting 210 to a rear wing spar 420 (shown in FIG. 7) as would be appreciated by one of ordinary skill in the art having the benefit of this disclosure.

A ball joint 170 (best shown in FIG. 4) positioned within a race 160 (best shown in FIG. 4) may be positioned within the opening 243 in cross member 240. The race 160 is configured to permit the movement of the ball joint 170 within the race 170 as discussed herein. The ball joint 170 is positioned within the first opening 243 of the cross member 240. An actuator 150 may be connected to the fitting 110 via a ball joint 170. The opening 243 in the cross member 240 may be configured to orient a fastener 180 (best shown in FIG. 1) to be vertically oriented even though the cross member 240 is canted. A fastener 180 and corresponding nut 181 may be used to selectively connect the second end 152 of the actuator 150 to the fitting 210 via the ball joint 170 as discussed herein.

Figure 9:
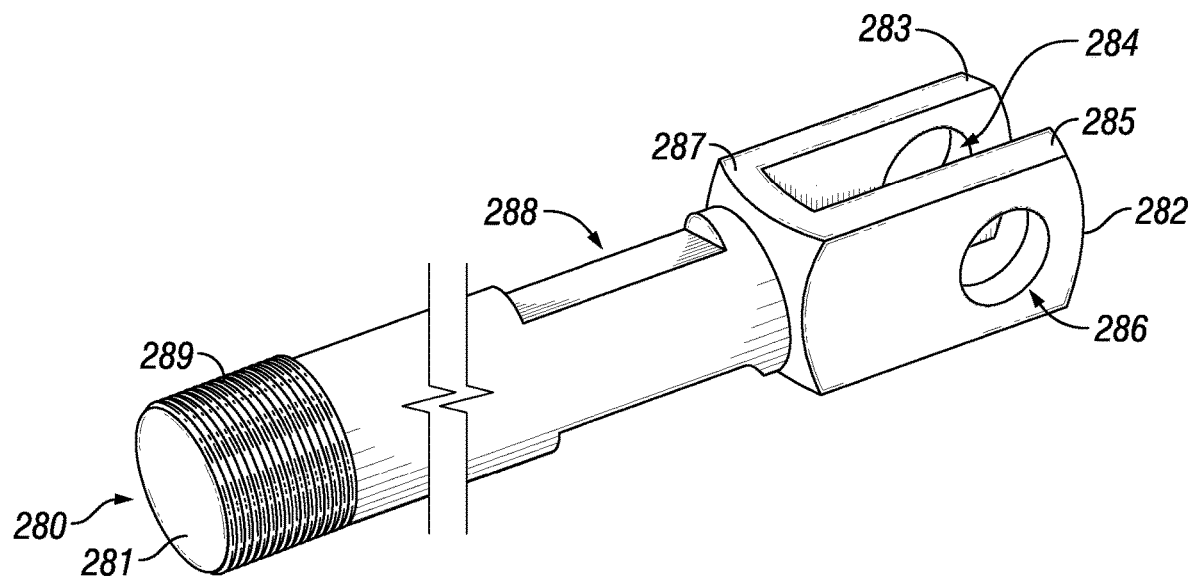
FIG. 9 is a schematic of an example of a rod for using in a breakaway support system.

Various components of the breakaway support system 300 may be configured to selectively release the actuator 150 from the fitting 110 in the event the actuator 150 moves past the first position or moves past the second position as would be appreciated by one of ordinary skill in the art having the benefit of this disclosure. For example, a rod 280 as shown in FIG. 9 may be configured to connect the second end 152 of the actuator 150 to the ball joint 170. The rod may have a first end 281 configured to connect to the second end 152 of the actuator and a second end 282 configured to connect to the ball joint 170. The second end 282 of the rod 280 may be formed in a clevis having an upper member 283, lower member 285, and a connecting member 287. The upper member 283 may include an opening 284 and the lower member 285 may include an opening 286 to permit the insertion of a fastener to selectively connect the rod 280 to the ball joint 170.

A portion 288 of the rod 280 may be configured to selectively break upon the exertion of a load due to the movement of the actuator 150 and rod 280 past a first position or past a second position. For example, the portion 288 of the rod 280 may have a smaller outer diameter than the outer diameter of adjacent portions of the rod 280. As the actuator 150 and rod 280 pivot in a first direction D1 past a first position, a first knuckle 144 on the top surface 141 of the cross member 140 may exert a load onto the rod 280 causing the portion 288 of the rod 280 to break releasing the actuator 150 from the fitting 110. Likewise, as the actuator 150 and rod 280 pivot in a second direction D2 past a second position, a second knuckle 145 on the bottom surface 142 of the cross member 140 may exert a load onto the rod 280 causing the portion 288 of the rod 280 to break releasing the actuator 150 from the fitting 110. The fitting 110 or a component of the fitting 110, such as the ball joint 170, may be configured to selectively break to release the actuator 150 from the fitting. For example, the rod 280 may be an integral component with the ball joint 170 and may be configured to selectively break to release the actuator 150 from the fitting 110 if the actuator moves past the first position or the actuator moves past the second position.

Figure 10:
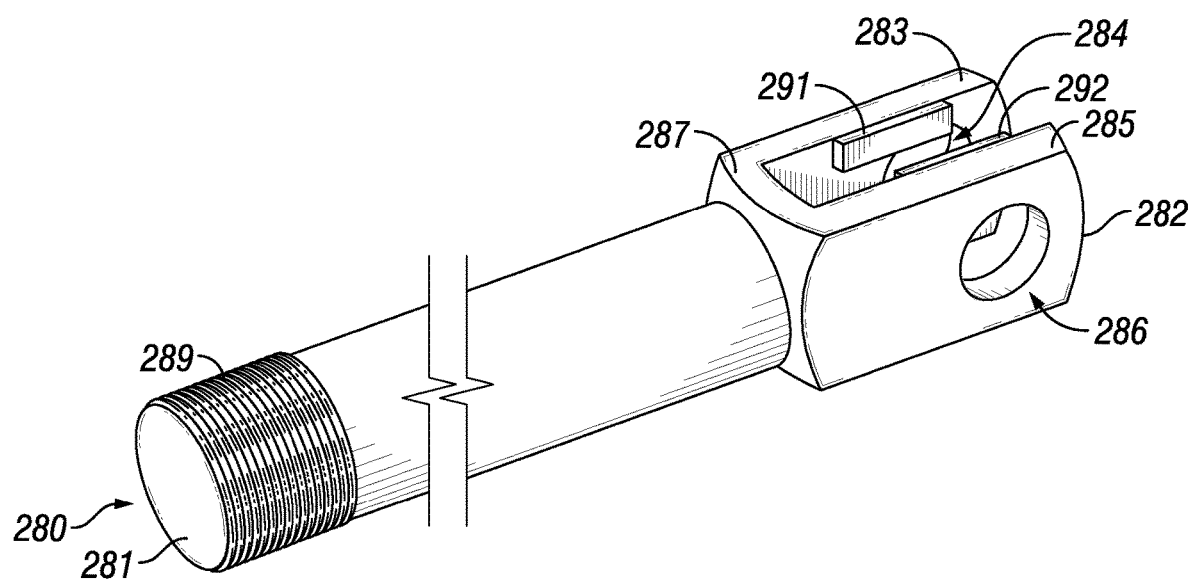
FIG. 10 is a schematic of an example of a rod for using in a breakaway support system.

Various components of the breakaway support system 300 may be configured to apply a load to selectively release the actuator 150 from the fitting 110 in the event the actuator 150 moves past the first position or moves past the second position as would be appreciated by one of ordinary skill in the art having the benefit of this disclosure. For example, a rod 280 as shown in FIG. 10 may be configured to connect the second end 152 of the actuator 150 to the ball joint 170. The rod may have a first end 281 configured to connect to the second end 152 of the actuator and a second end 282 configured to connect to the ball joint 170.

The second end 282 of the rod 280 may be formed in a clevis having an upper member 283, lower member 285, and a connecting member 287. The upper member 283 may include an opening 284 and the lower member 285 may include an opening 286 to permit the insertion of a fastener to selectively connect the rod 280 to the ball joint 170. The rod 280 may include a first knuckle 291 that extends into the clevis from the upper member 283 and a second knuckle 292 that extends into the clevis from the lower member 285. The first or second knuckle 291, 292 may apply a load to the rod 280, actuator 150, and/or fitting 110 if the actuator 150 and rod 280 pivot in a first direction D1 past a first position or the actuator 150 and rod 280 pivot in a second direction D2 past a second position causing a portion of the actuator 150, fitting 110, or rod 280 to break and selectively release the actuator 150 from the fitting 110.

Figure 11:
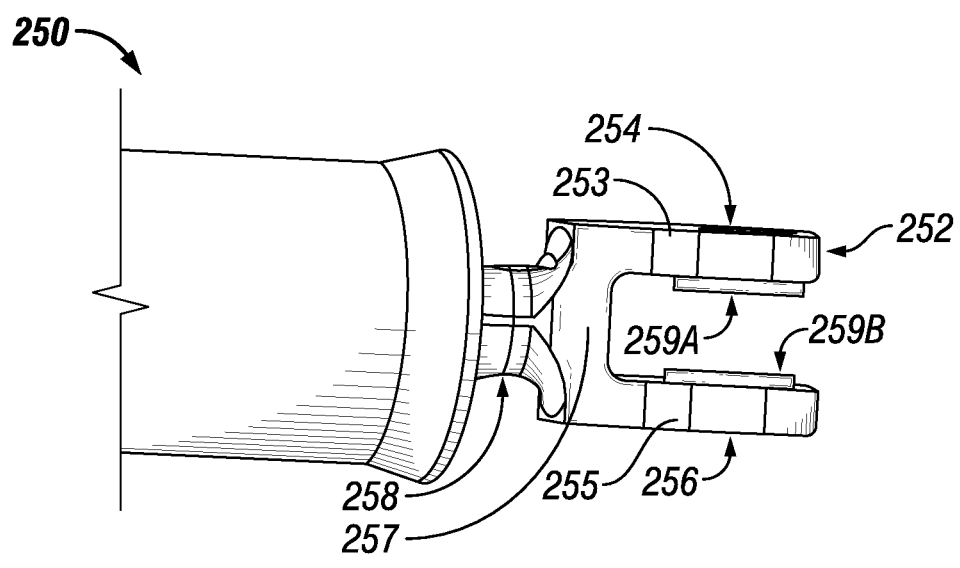
FIG. 11 is a schematic of an example of an actuator for use in a breakaway support system.

FIG. 11 is a schematic of a portion of an example of an actuator 250 for use in a breakaway support system. The actuator 250 is configured to apply a load if the actuator 250 pivots in a first direction D1 past a first position or the actuator 250 pivots in a second direction D2 past a second position causing a portion a support system to break and selectively release the actuator 250 from the fitting 110. The second end 252 of the actuator 250 is formed into a clevis, or fork. The clevis includes an upper member 253 and a lower member 255 connected via a connecting member 257. A first knuckle 259A extends into the clevis from the upper member 253 and a second knuckle 259B extends into the clevis from the lower member 255. The first and second knuckles 259A, 259B are configured to apply a load to the fitting 110, actuator 250, and/or a connecting rod 280 due to movement of the actuator 250 past a first position or past a second position as discussed herein.

As discussed herein, the upper member 253 includes an opening 254 and the lower member 255 includes an opening 256 that enables the second end 252 of the actuator 250 to be selectively connected to a fitting 110 via a ball joint 170. A fastener 180 may be positioned through the opening 254 in the upper member 253 of the clevis, through the race 160 and opening 171 in the ball joint 170 positioned in the opening 143 of the cross member 140, and through the opening 256 in the lower member 255 of the clevis. The openings 143, 254, 256, 171 are configured so that the fastener 180 is aligned vertically with respect to the end of the actuator 250. As discussed herein, a portion of the actuator 250, a connecting rod 280, or the fitting 110 may be configured to break to selectively release the actuator 250 from the fitting 110 upon application of a load from either knuckle 259A, 259B. For example, a portion 258 of the actuator 250 may be necked down.

Figure 12:
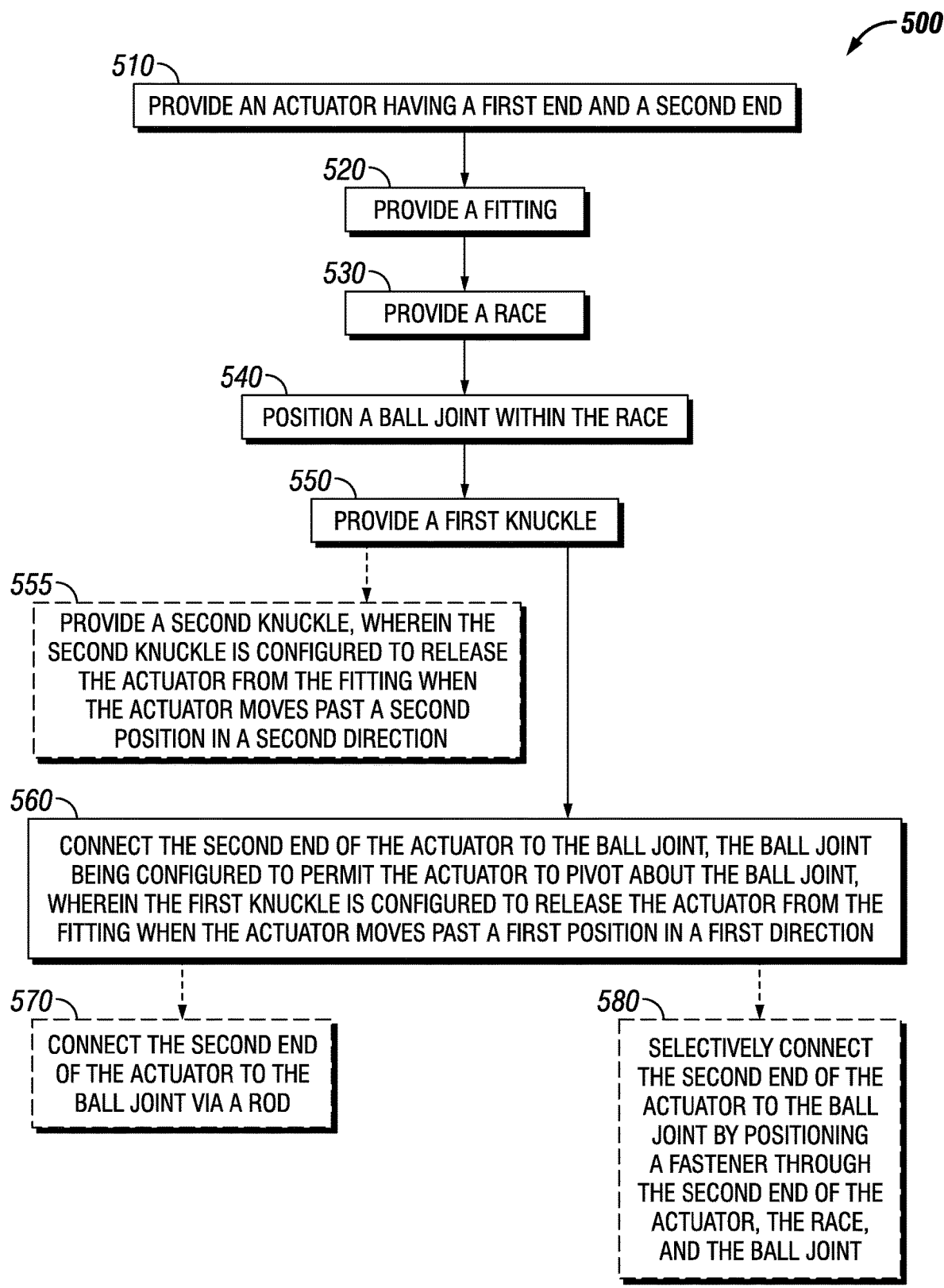
FIG. 12 is a flow chart for an example of a method of providing a breakaway support for an aircraft comprising.

FIG. 12 is a flow chart for an example of a method 500 of providing a breakaway support for an aircraft. The method 500 includes providing an actuator having a first end and a second end, at 510. For example, an actuator 150 configured to retract and extend the landing gear of an aircraft is provided as discussed herein. The method 500 includes providing a fitting, at 520. For example, a fitting 110 or 210 that is configured to connect to an actuator 150, a landing gear beam 410, and a wing rear spar 420 as discussed herein.

At 530, the method 500 includes providing a race and, at 540, positioning a ball joint within the race. For example, a ball joint 170 may be positioned within a race 160 as discussed herein. The method 500 includes providing a first knuckle, at 550, and connecting the second end of the actuator at the ball joint, the ball joint being configured to permit the actuator to pivot about the ball joint, wherein the first knuckle is configured to release the actuator from the fitting when the actuator moves past a first position in a first direction, at 560. For example, the first knuckle may be a first knuckle 144 that extends from a top surface 141 of a cross member 140 of the fitting 110 as discussed herein. The first knuckle 144 may apply a load when the actuator moves past a first position in a first direction to release the actuator 150 from the fitting 110 as discussed herein. The first knuckle may be located on a portion of a fitting 110, 210, a portion of an actuator 150, 250, or on a portion of a rod 280 configured to connect an actuator 150, 250 to a fitting 110, 210 as discussed herein.

The method 500 may include providing a second knuckle, wherein the second knuckle is configured to release the actuator from the fitting when the actuator moves past a second position in a second direction, at 555. For example, the second knuckle may be a second knuckle 145 that extends from a bottom surface 142 of a cross member 140 of the fitting 110 as discussed herein. The second knuckle 145 may apply a load when the actuator moves past a second position in a second direction to release the actuator 150 from the fitting 110 as discussed herein. The second knuckle may be located on a portion of a fitting 110, 210, a portion of an actuator 150, 250, or on a portion of a rod 280 configured to connect an actuator 150, 250 to a fitting 110, 210 as discussed herein.

The method 500 may include connecting the second end of the actuator to the ball joint via a rod, at 570. For example, a rod 280 may be configured to connect an actuator 150, 250 to a ball joint 170 positioned within a race 160 as discussed herein. The method 500 may include selectively connecting the second end of the actuator to the ball joint by positioning a fastener through the second end of the actuator, the race, and the ball joint, at 580. For example, a fastener 180 may be oriented through openings in the second end 152, 252 of the actuator 150, 250, the race 160, and the ball joint 170 to connect the actuator 150, 250 to the fitting 110, 210 via the ball joint 170 as discussed herein.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A breakaway support for an aircraft, the breakaway support comprising:
    an actuator having a first end and a second end;
    a fitting;
    a race positioned between the actuator and the fitting;
    a ball joint, located within the race, wherein the second end of the actuator is connected to the fitting via the ball joint, so that the actuator is able to pivot in a vertical plane between a first position and a second position; and
    a first knuckle, wherein, when the actuator moves in a first direction beyond the first position, the first knuckle exerts a force directly onto the actuator and causes the actuator to release from the fitting.

2. The breakaway support of claim 1, comprising a second knuckle, wherein, when the actuator moves in a second direction beyond the second position the second knuckle exerts a force directly onto the actuator and causes the actuator to release from the fitting.

3. The breakaway support of claim 2, wherein a portion of the actuator is configured to break to release the actuator from the fitting when the actuator moves in the first direction beyond the first position or when the actuator moves in the second direction beyond the second position.

4. The breakaway support of claim 3, wherein the portion of the actuator configured to break has a reduced outer diameter compared to an outer diameter of adjacent portions of the actuator.

5. The breakaway support of claim 2, wherein the first knuckle is located on the actuator and wherein the second knuckle is located on the actuator.

6. The breakaway support of claim 2, wherein the first knuckle is located on the fitting and Wherein the second knuckle is located on the fitting.

7. The breakaway support of claim 1, comprising a fastener, coupling the second end of the actuator to the fitting via the ball joint, wherein the fastener is positioned through an opening in the bail joint.

8. The breakaway support of claim 7, wherein the fastener is oriented in a vertical direction along a central axis of the ball joint.

9. The breakaway support of claim 8, herein:
    a portion of the fitting comprises an opening,
    the ball joint is positioned within the opening of the fitting,
    the second end of the actuator comprises a clevis, and the portion opening of the fitting, the race, and the ball joint are positioned within the clevis.

10. The breakaway support of claim 9, the clevis comprising a first opening and a second opening, wherein the fastener passes through the first opening in the clevis, the race, the opening in the ball joint, and the second opening in the clevis to couple the second end of the actuator to the fitting via the ball joint.

11. The breakaway support of claim 1, further comprising a main landing gear trunnion of the aircraft, wherein the first end of the actuator is connected to the main landing gear trunnion.

12. The breakaway support of claim 11, wherein the actuator is configured to retract and extend the main landing gear trunnion.

13. A breakaway support for an aircraft, the breakaway support comprising:
    an actuator, having a first end and a second end;
    a fitting:
    a race, positioned between the actuator and the fitting;
    a ball joint, located within the race, wherein the second end of the actuator is connected to the fitting via the ball joint so that the actuator is able to pivot in a vertical plane between a first position and a second position;
    a first knuckle, wherein the first knuckle causes the actuator to release from the fitting when the actuator moves in a first direction beyond the first position;
    a second knuckle, wherein the second knuckle causes the actuator to release from the fitting when the actuator loves in a second direction beyond the second position; and
    a rod that connects the second end of the actuator to the ball joint, wherein a portion of the rod is configured to break so that the actuator is released from the fitting when the actuator moves in the first direction beyond the first position, or when the actuator moves in the second direction beyond the second position.

14. The breakaway support of claim 13, wherein the portion of the rod has a reduced outer diameter compared to an outer diameter of adjacent portions of the rod.

15. The breakaway support of claim 14, wherein the rod is a unitary component of the ball joint.

16. The breakaway support of claim 13, wherein the first knuckle is located on the rod and Wherein the second knuckle is located on the rod.

17. A breakaway support system, comprising:
    a fitting, comprising a first vertical wall, a second vertical wall that extends from the first vertical wall, and a cross member, connected between the first vertical wall and the second vertical wall, wherein the second vertical wall is perpendicular to the first vertical wall, and wherein the cross member comprises a first opening;
    an actuator, having a first end and a second end, the actuator configured to retract and extend a landing gear of an aircraft;
    a race, positioned within the first opening in the cross member;
    a ball joint, located within the race, wherein the race is positioned between the second end of the actuator and the cross member so that the actuator is able to pivot in a vertical plane between a first position and a second position; and
    a first knuckle, which causes the actuator to release from the fitting when the actuator moves in a first direction beyond the first position.

18. The breakaway support system of claim 17, wherein the cross member is horizontal with respect to the first vertical wall and the second vertical wall.

19. The breakaway support system of claim 18, comprising a second knuckle, wherein the second knuckle causes the actuator to release from the fitting when the actuator moves in a second direction beyond the second position.

20. The breakaway support system of claim 19, wherein the first knuckle extends from a top surface of the cross member and wherein the second knuckle extends from a bottom surface of the cross member.

21. The breakaway support system of claim 19, wherein the actuator comprises a breakaway portion configured to break to release the actuator from the fitting when the actuator moves in the first direction beyond the first position or when the actuator moves in the second direction beyond the second position.

22. The breakaway support system of claim 17, wherein the cross member causes the actuator to release from the fitting when the actuator moves in a second direction beyond the second position.

23. The breakaway support system of claim 17, wherein:
the second end of the actuator comprises a clevis, and
the first opening of the cross member, the race, and the ball joint are positioned within the clevis.

24. The breakaway support system of claim 23, comprising a fastener to selectively connect the second end of the actuator to the fitting, wherein the fastener extends through the clevis, the race, and the ball joint, and wherein the fastener is oriented parallel with the first vertical wall and the second vertical wall.

25. The breakaway support system of claim 17, further comprising a landing gear beam,
wherein:
the first vertical wall of the fitting comprises a second opening and a third opening, and
the landing gear beam is connected to the fitting via the second opening and the third opening in the first vertical wall of the fitting.

26. The breakaway support system of claim 25, wherein the second vertical wall of the fitting comprises a fourth opening and a fifth opening configured to connect the fitting to a wing of the aircraft.

27. A method of installing the breakaway support of claim 2, the method comprising:
positioning the race between the actuator and the fitting;
positioning the ball joint within the race; and
connecting the second end of the actuator to the ball joint.

28. The method of claim 27, further comprising releasing the actuator from the fitting when the actuator moves past the second position in the second direction.

29. The method of claim 27, further comprising using the second knuckle to release the actuator from the fitting when the actuator moves past the second position in the second direction.

30. The method of claim 27, further comprising breaking a portion of the actuator to release the actuator from the fitting.

31. The method of claim 27, further comprising connecting the second end of the actuator to the ball joint via a rod.

32. The method of claim 31, further comprising breaking a portion of the rod to release the actuator from the fitting.

33. The method of claim 27, further comprising selectively connecting the second end of the actuator to the ball joint by positioning a fastener through the second end of the actuator, the race, and the ball joint.

* * * * *

UNITED STATES PATENT AND TRADEMARK OFFICE
CERTIFICATE OF CORRECTION

PATENT NO. : 11,130,563 B2
APPLICATION NO. : 16/183489
DATED : September 28, 2021
INVENTOR(S) : Heer et al.

It is certified that error appears in the above-identified patent and that said Letters Patent is hereby corrected as shown below:

In the Claims

Column 11 Lines 36-40 Claim 2 should read:
2. The breakaway support of claim 1, comprising a second knuckle, wherein, when the actuator moves in a second direction beyond the second position, the second knuckle exerts a force directly onto the actuator and causes the actuator to release from the fitting.

Column 11 Lines 53-55 Claim 6 should read:
6. The breakaway support of claim 2, wherein the first knuckle is located on the fitting and wherein the second knuckle is located on the fitting.

Column 11 Lines 56-59 Claim 7 should read:
7. The breakaway support of claim 1, comprising a fastener, coupling the second end of the actuator to the fitting via the ball joint, wherein the fastener is positioned through an opening in the ball joint.

Column 11 Line 63-Column 12 Line 2 Claim 9 should read:
9. The breakaway support of claim 8, wherein:
a portion of the fitting comprises an opening,
the ball joint is positioned within the opening of the fitting,
the second end of the actuator comprises a clevis, and
the portion of the fitting, the race, and the ball joint are positioned within the clevis.

Column 12 Lines 17-39 Claim 13 should read:
13. A breakaway support for an aircraft, the breakaway support comprising:
    an actuator, having a first end and a second end;
    a fitting;
    a race, positioned between the actuator and the fitting;
    a ball joint, located within the race, wherein the second end of the actuator is connected to the fitting via the ball joint so that the actuator is able to pivot in a vertical plane between a first position and a second position;

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office* a first knuckle, wherein the first knuckle causes the actuator to release from the fitting when the actuator moves in a first direction beyond the first position;

a second knuckle, wherein the second knuckle causes the actuator to release from the fitting when the actuator moves in a second direction beyond the second position; and a rod that connects the second end of the actuator to the ball joint, wherein a portion of the rod is configured to break so that the actuator is released from the fitting when the actuator moves in the first direction beyond the first position, or when the actuator moves in the second direction beyond the second position.

Column 12 Lines 45-47 Claim 16 should read:
16. The breakaway support of claim 13, wherein the first knuckle is located on the rod and wherein the second knuckle is located on the rod.